United States Patent [19]

Banks

[11] Patent Number: 5,331,762
[45] Date of Patent: Jul. 26, 1994

[54] FISHING LURE WITH INTERCHANGEABLE HEADS

[76] Inventor: Waverly S. Banks, Rte. 3, Box 132 C, Culpeper, Va. 22701

[21] Appl. No.: 141,104

[22] Filed: Oct. 26, 1993

[51] Int. Cl.⁵ .............................................. A01K 91/00
[52] U.S. Cl. .................................... 43/42.09; 43/42.22
[58] Field of Search ................. 43/42.09, 42.22, 42.23, 43/42.47

[56] References Cited

U.S. PATENT DOCUMENTS

| | | | |
|---|---|---|---|
| 1,155,883 | 10/1915 | Burkman | 43/42.23 |
| 1,288,118 | 12/1918 | Morian | |
| 1,477,864 | 12/1923 | Bolton | |
| 1,867,458 | 7/1932 | Keuper | |
| 1,989,460 | 1/1935 | Porter | |
| 2,290,512 | 7/1942 | Weesner | 43/42.09 |
| 2,295,292 | 9/1942 | Rogers | 43/42.23 |
| 2,494,384 | 1/1950 | Gadzinski | 43/42.22 |
| 2,612,716 | 10/1952 | Hedland | |
| 2,640,292 | 6/1953 | Nadolny | |
| 2,665,515 | 1/1954 | Frantello | |
| 2,875,549 | 3/1959 | O'Sullivan | 43/42.22 |
| 4,697,378 | 10/1987 | Tunstall | 43/42.09 |
| 5,182,876 | 2/1993 | Lewis | 43/42.09 |

FOREIGN PATENT DOCUMENTS 2259533  8/1975  France .................................. 43/42.09
00944901 12/1963 United Kingdom .

Primary Examiner—P. Austin Bradley
Assistant Examiner—James Miner
Attorney, Agent, or Firm—Richard C. Litman

[57] ABSTRACT

A fishing lure having a body portion and a separate head portion, provides for the ready removal and installation of the head upon the body. Several heads having different hydrodynamic characteristics may be provided with the lure, allowing the interchangeability of the different heads to suit the particular effect desired for the conditions; e. g., bottom running, surface running, oscillating "jitterbug," or turbulent "popper" action. The lure and heads include provision for locking the heads in alignment with the body, in order to insure that any markings and/or colorings on the head and body are aligned. Provision is also made for the ready removal and replacement of the hook(s) from the body portion, to allow the hooks to be sharpened or replaced as needed. At least the body portion is preferably formed of solid wood for buoyancy, but may be formed of synthetic (e. g., plastic) materials if desired. The lure allows only a single body, with the hook(s) thereon, to be carried, thus eliminating the clutter and snarls of a multitude of complete lures, along with their hooks and leaders, being carried in a tackle box.

13 Claims, 3 Drawing Sheets

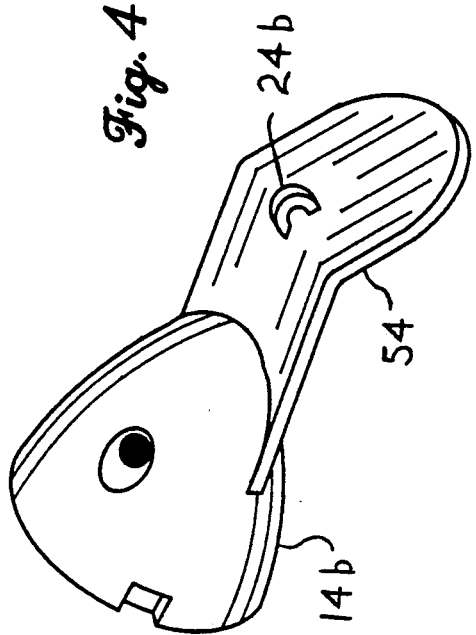
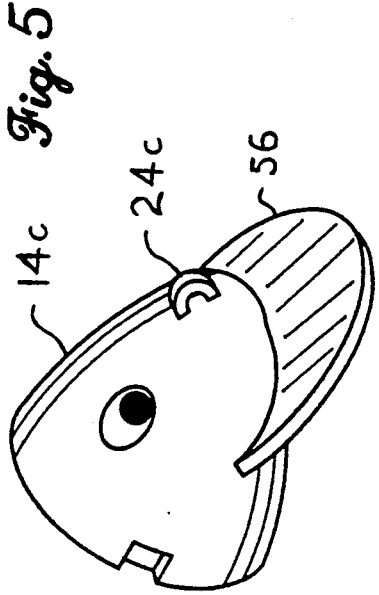
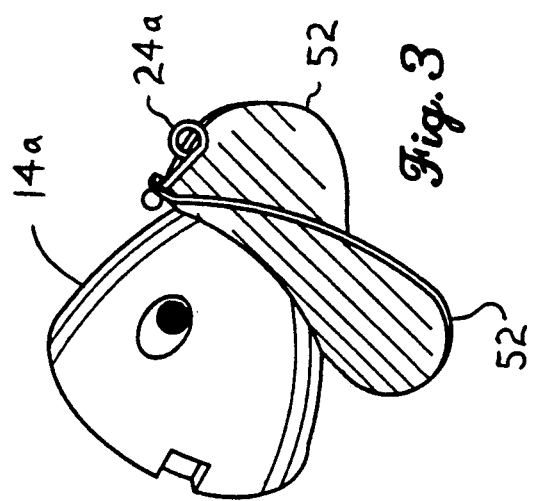

FISHING LURE WITH INTERCHANGEABLE HEADS

FIELD OF THE INVENTION

The present invention relates generally to fishing lures, and more specifically to a lure having a universal body portion and providing for the interchangeability of the head portions thereon for different conditions, and moreover providing for the interchangeability of hooks on the body portion.

BACKGROUND OF THE INVENTION

The sport of fishing has become more and more complex as it has evolved, with fishermen discovering that different types of fish are attracted to different types of bait or lures, and that even a single fish species is attracted to different baits or lures at different times and conditions. Accordingly, the well equipped sport fisherman will possess a vast variety of lures, with each lure intended to attract a specific type of fish under certain specific conditions. While some interchangeability of application exists between these different lures, a large number is still required, as a fisherman never knows for certain in advance, just exactly what type of lure will attract a given type of fish under the given conditions of the day. Indeed, it can be difficult to ascertain in advance just what the conditions might be.

Several problems arise when one is forced to carry such a large number of lures in order to have a suitable lure for virtually any circumstance. First, the sheer bulk of such a collection requires the use of a relatively large tackle box, which is cumbersome and unwieldy, particularly if fishing from a small boat. Second, the weight of such a lure collection and tackle box render it difficult to more rapidly from one location to another if necessary, such as when fishing from shore, riverbank or the like when conditions change. Third, the hooks and leaders of the lures tend to become tangled and snarled; this problem increases dramatically with increasing numbers of lures, even with separate containers or compartments for many of the lures. Oftentimes, when a certain type of fish is striking at a given type of lure, there is no time to put away a lure carefully when it is changed for another more attractive one, and it is merely tossed into the tackle box where it becomes entangled with other lures. The time later wasted in untangling such a mess is exasperating at best.

The need arises for a fishing lure having a universal body, with easily removable and replaceable hooks attached thereto, and a plurality of interchangeable heads providing different hydrodynamic and other characteristics for the lure. The different heads may be readily interchanged, depending upon the specific needs for the conditions (e.g., deep running, surface running, etc.). The easily replaceable hooks can be removed for sharpening or replacement when they become dull, thus simplifying a fisherman's tackle box and eliminating all of the above problems.

DESCRIPTION OF THE PRIOR ART

U.S. Pat. No. 1,288,118 issued to F. Raymond Morian on Dec. 17, 1918 discloses a Casting Bait or lure having a replaceable head. The spring clips holding the head to the body are disposed forwardly, and the forward ends are likely to catch upon weeds and other underwater vegetation, and pulled loose from their attachment to the head. Only two types of heads are disclosed: A spinning head and a non-spinning head. These heads do not affect the path of the lure through the water; no differently shaped heads for providing different hydrodynamic action (e.g., surface or bottom running, etc.) are disclosed. Moreover, no disclosure is made of easily removable and replaceable hooks on the body portion.

U.S. Pat. No. 1,477,864 issued to George W. Bolton on Dec. 18, 1923 discloses an Artificial Bait or lure having a removable and replaceable portion of the body. Differently patterned decorative attachments may be installed upon the main body of the lure, but the main portion of the body and its shape and hydrodynamic action remain unchanged, as do the hooks attached to the main body portion.

U.S. Pat. No. 1,867,458 issued to Joe S. Keuper on Jul. 12, 1932 discloses a Fish Bait or lure having a plurality of removable and replaceable sections. While the disclosure specifically provides for the installation or removal of portions of the body to adjust the length of the lure to affect the lure action, only a single type of head is disclosed. Moreover, no provision is made for ease of removal and replacement of the hooks on the lure.

U.S. Pat. No. 1,989,460 issued to William K. Porter on Jan. 29, 1935 discloses an Animated Fish Lure wherein the rotatable head portion and the body portion are permanently secured together; only the outer shell of the head is removable. This outer shell is arranged to wobble on the fixed head portion to provide action, but the hydrodynamic action creating the movement is provided by a vane or spinner disposed upon a shaft extending forward from the head and shell, and not from the head itself. A non-standard, specialized hook having an eyelet at the juncture of the hooks must be used, to provide for attachment of the tail portion of the lure to the hook. The hook is not readily removable from the rest of the lure, due to its installation within the center of the lure and use as a structural member to hold the tail portion of the lure.

U.S. Pat. No. 2,612,716 issued to Harry A. Hedland on Oct. 7, 1952 discloses a Fishing Lure having a single hook and leader carrier comprising a rib running the entire length of the lure. The hook/leader carrier includes a catch extending through the body of the lure, to secure the lure body to the carrier. The lure body is replaceable upon the carrier, but does not provide any structural means for the lure. The disclosure mentions the use of different lure bodies providing different actions, but no specific means is disclosed for such. In addition, the leader and hooks do not attach to the lure body, as in the present invention, but rather attach to the carrier upon which the lure body is installed.

U.S. Pat. No. 2,640,292 issued to Clarence J. Nadolny on Jun. 2, 1953 discloses a Fish Lure having a hollow, transparent central section in which a live minnow or other bait may be installed. The head and tail portions form plugs at each end of the body portion. No means is disclosed for readily removing and replacing the hooks, nor is any means provided for the precise alignment of the head or tail portions of the lure with the body portion. The leader is attached to the body portion, rather than to the head as in a standard lure, due to the relatively fragile means for securing the head to the body.

U.S. Pat. No. 2,665,515 issued to Alfio A. Frantello on Jan. 12, 1954 discloses a Fish Lure having a covering of sequins thereon to simulate scales. In one embodiment, no head is disclosed, while in a second embodiment the head is permanently affixed to the body of the lure; no means for removal is disclosed. Moreover, when the head portion is attached, no means for the attachment of a leader to the lure is disclosed. The hooks are not easily removable and replaceable, as in the present invention.

Finally, British Patent No. 944,901 issued to Patrick J. Cummins and published on Dec. 18, 1963 discloses Improvements In Or Relating To Fishing Baits. A central axis allows the head and a spinner to be separated from the body. However, the only change in the hydrodynamic action of the lure is provided by differing the angles of the different spinner elements, not by changing the head portion. No disclosure is made of differently configured heads; only different head colors are disclosed. The head provides no means for attachment of the leader, nor does the body provide for the attachment of the hook(s), as in the present invention. The leader and hook are attached to the central shaft upon which the head and body are free to rotate.

None of the above noted patents, taken either singly or in combination, are seen to disclose the specific arrangement of concepts disclosed by the present invention.

SUMMARY OF THE INVENTION

By the present invention, an improved fishing lure is disclosed.

Accordingly, one of the objects of the present invention is to provide an improved fishing lure which provides for the interchangeability of various heads thereof, with each of the different heads providing for different hydrodynamic characteristics to alter the action of the lure.

Another of the objects of the present invention is to provide an improved fishing lure which provides for the interchangeability of the hooks secured thereto, to allow for sharpening or replacement of the hooks.

Yet another of the objects of the present invention is to provide an improved fishing lure which provides for the removal of the head therefrom without requiring the use of tools.

A further object of the present invention is to provide an improved fishing lure which includes locking means to insure that the head and body maintain their proper relative alignment with one another and to prevent the head from separating from the body.

An additional object of the present invention is to provide an improved fishing lure which includes a plurality of heads individually attachable to a single body portion, thereby reducing the number of separate lures required for various fishing conditions.

Still another object of the present invention is to provide an improved fishing lure which at least the body portion is formed of a solid material and is devoid of any internal mechanism, and which provides positive buoyancy to the lure.

A final object of the present invention is to provide an improved fishing lure for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 3 is a perspective view of an alternate head portion providing an erratic lure action when attached to the body portion.

FIG. 4 is a perspective view of another alternate head portion, causing the lure to run well below the surface when attached to the body portion.

FIG. 5 is a perspective view of another alternate head portion, causing the lure to run near the surface when attached to the body portion.

Similar reference characters denote corresponding features consistently throughout the several figures of the attached drawings.

DETAILED DESCRIPTION OF THE PREFERRED EMBODIMENT

Figure 1:
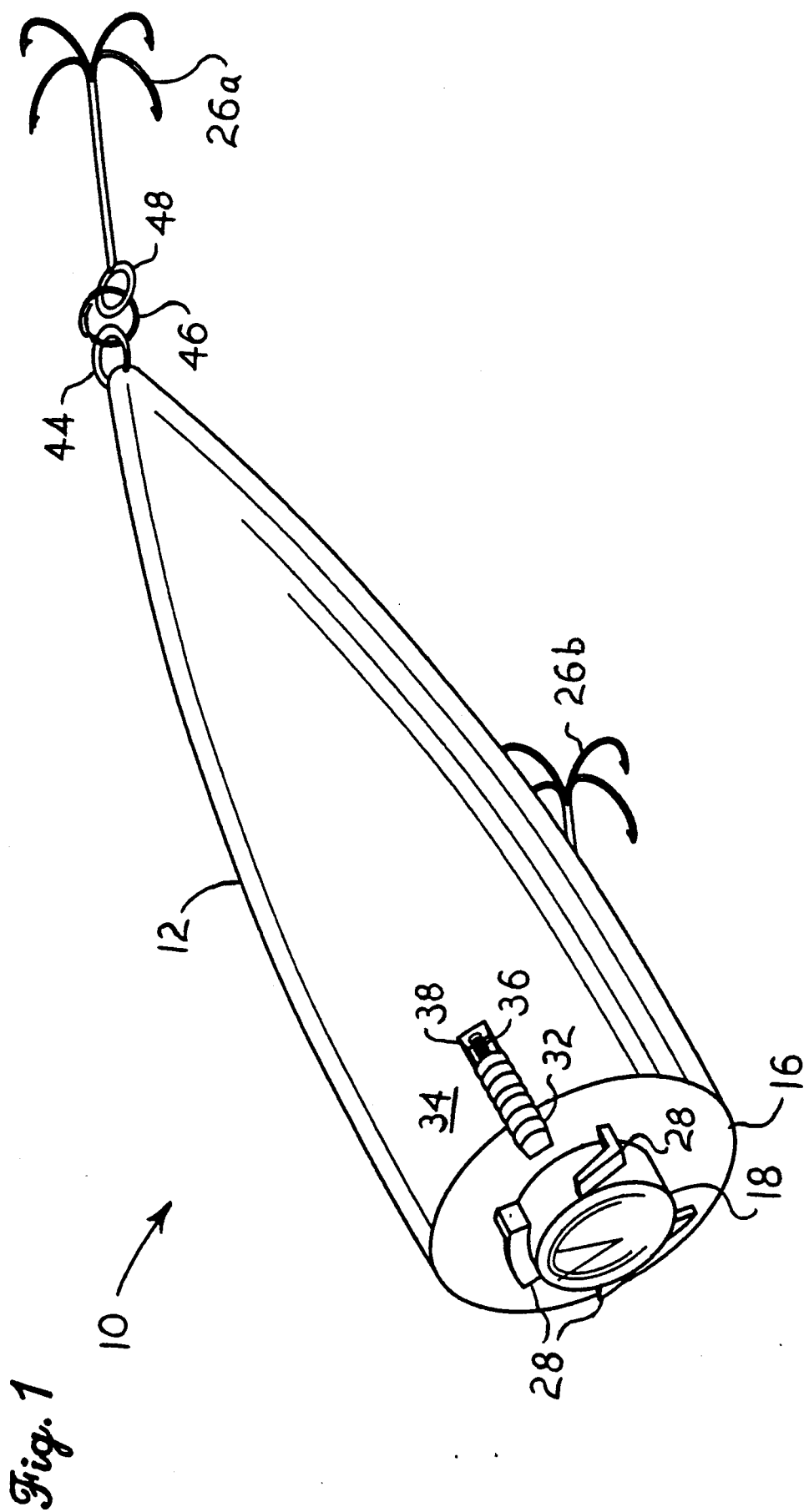
FIG. 1 is a perspective view of the body portion of the lure of the present invention, showing the attachment mechanism on the body portion providing for securing the head portion thereto.
Figure 2:
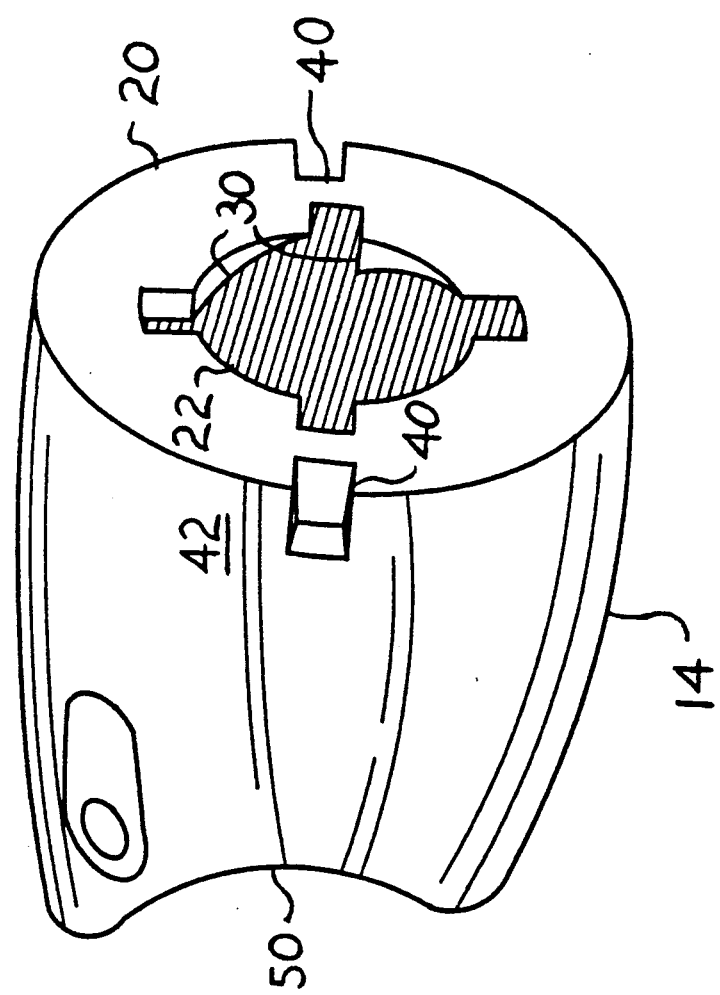
FIG. 2 is a perspective view of the back of the head portion, showing the cooperating attachment means for securing the head portion to the body portion.

Referring now particularly to FIGS. 1 and 2 of the drawings, the present invention will be seen to relate to a lure 10 having a separate body portion 12 (FIG. 1) and head portion 14 (FIG. 2). The body portion 12 (as well as the head portion 14) is preferably formed as a single, monolithic, unitary and solid component, thus providing sturdiness and durability. The body portion 12 and head portion 14 may be formed of a variety of materials, such as wood or a synthetic material such as plastic, but preferably is formed of material less dense than water for positive buoyancy and flotation.

The body portion 12 will be seen to have a truncated forward end 16 which includes a concentric plug 18 extending therefrom. The head portion 14 of FIG. 2 includes a rear portion 20 which mates closely with the forward end 16 of the body 12 of the lure 10 when assembled thereto. A concentric socket 22 is formed in the rear end portion 20 of the head 14, which socket 22 is sized and shaped to mate closely with the plug 18 of the body portion 12 of the lure 10.

Each of the head portions 14, 14a (FIG. 3), 14b (FIG. 4), and 14c (FIG. 5) includes an eye 24a, 24b, and 24c (shown respectively in FIGS. 3, 4, and 5; the eye is not visible at the front of the head 14 of FIG. 2). These eyes 24a through 24c provide for the attachment of a leader (not shown) thereto. With such a leader applying a tensile force to the head portion of the lure, and the possibility of the body portion 12 becoming fouled or snagged upon weeds or other objects in the water, or of course the possibility of a fish attacking the lure and becoming hooked on the hooks 26a and 26b of the body portion 12, it will be seen that some means of preventing the body portion 12 from separating from the head portion 14 is required. This is accomplished by means of a series of helical ramps 28 extending radially from the sides of the plug 18 of the body portion 10, and a series of mating helical slots 30 formed in the side walls of the socket 22 of the head portion 14. The mating helical ramps 28 and slots 30 will be seen to operate similarly to screw threads, but do not require the multiple number of turns such screw threads normally require for securing one article to another. The lure 10 of the present invention may be assembled with a turn of 90 degrees or less to secure the head portion 14 to the body portion 12.

In addition to the above helical attachment means, a means is provided to preclude the inadvertent separation of the body and head components 12 and 14, by preventing the rotation of one relative to the other and thereby allowing their separation. The body portion 12 includes two opposed latches 32 which slide longitudinally in the forward sides 34 of the body portion 12. Spring means, such as the coil springs 36 shown, are installed at the rearward ends of the slide slots 38 in the body portion 12 to urge the latches 32 forward. The head portion 14 of the lure 10 includes opposed grooves 40 in the rearward sides 42, which grooves 40 are formed to fit closely the latches 32.

When one of the heads 14 through 14c is helically installed upon the universal body portion 12, initially some space exists between the front end 16 of the body portion 12 and the rearward end 20 of the head portion, thus providing clearance for the extended ends of the latches 32 of the body portion 12. However, as the head 14 (or 14a through 14c) is helically advanced toward the body portion 12, the rearward end surface 20 of the head portion 14 (or 14a through 14c) will contact the extended ends of the latches 32, causing them to retract against the springs 36 and withdraw into their respective latch slots 38. When the head portion is fully advanced upon the helical ramps 28 of the body portion 12, the mating grooves 40 (or 40a through 40c) of the head portion 14 (or 14a through 14c) will align with the latches 32 of the body portion 12, whereupon the springs 36 will cause the latches 32 to extend automatically to engage the mating grooves 40 (or 40a through 40c) of the head portion, thus automatically locking the two components 12 and 14 together and preventing relative rotation thereof and resulting inadvertent disconnection.

The above structure further provides for ease of intentional disconnection of the two components 12 and 14, by grasping the body portion 12 in one hand and simultaneously sliding the two latches 32 rearward, e.g. with opposed thumb and forefinger. The other hand may then twist the head portion 14 off of the body portion 12 to separate the two. The above described structure thus provides for rapid exchange of one of the head portions 14 through 14c with the universal body portion 12, depending upon the immediate need of the user and the ambient conditions.

In addition to the above described provision for removing and securing the different types of head portions 14 through 14c to the body portion 12 of the lure 10, the lure body portion 12 also includes means providing for the removable installation and replacement of the hooks 26a and 26b. One or more eyes 44 are installed in the body portion 12 at various locations, e.g., the rearward end 46 and the side (not shown), as desired. Each of the body eyes 44 are solid, unbroken loops, to preclude the unintentional separation of an article attached thereto. A split ring 46 is removably installed upon each of the body eyes 44, to allow for the removable installation of a hook 26a or 26b thereon by means of a conventional hook eye 48. When a hook 26a or 26b becomes dull or damaged, the split ring 46 may be removed from the hook eye 48, and/or the split ring 46 removed from the body eye 44, and the hook 26a or 26b discarded, repaired or sharpened as needed. The hook 26a or 26b (or a new hook) may then be reinstalled by threading the split ring 46 through the hook eye 48, and the assembly reinstalled upon the body eye 44. Thus, the entire lure need not be discarded when one or more hooks is damaged, as in the case of lures having fixed and non-removable hooks thereon.

FIGS. 2 through 5 disclose a variety of heads 14 through 14c providing for different hydrodynamic action and travel paths through the water. The head portion 14 of FIG. 2 includes a concave forward end 50, which tends to create a relatively large amount of turbulence or "popping" action in the water as it is intermittently drawn along the surface, as in retrieving the lure 10 after a cast. The splashing effect of the water on the surface tends to attract some fish under certain conditions. On the other hand, at times a different lure action may be desirable, such as the oscillating or "jitterbug" action produced by the two forwardly angled vanes 52 of the lure head 14a of FIG. 3. At other times, a deeper running lure may be desirable. The head 14b of FIG. 4 includes a relatively large and downwardly angled forward plate 54, serving to drive the lure 10 deeply downward in the water as the lure is drawn therethrough, as in retrieving a cast or in trolling. Under still other conditions, it may be desirable to use a lure having an action causing it to run relatively close to the surface. The relatively small and shallowly angled forward plate 56 of the lure head 14c of FIG. 5 provides such action.

Thus, the present invention provides for multiple hydrodynamic actions and paths through the water for a single fishing lure, by means of the interchangeable head portions thereof. By merely exchanging one of the head portions for another, a lure having completely different characteristics, and attracting different fish under different conditions, is created using a single universal lure body. Moreover, the removable installation of the hooks on the body portion provide for new or reconditioned hooks to be installed thereon as needed, still using a single lure body.

It is to be understood that the present invention is not limited to the sole embodiment described above, but encompasses any and all embodiments within the scope of the following claims.

I claim:

1. A fishing lure providing for the interchangeability of portions thereof, comprising:

a universal body portion including at least one hook attached thereto;

a plurality of head portions each singly attachable to said universal body portion, with each of said head portions including means providing for the attachment of leader thereto and different means affecting the hydrodynamic action and path of said lure; and said body portion having a forward end and forward side and each of said head portions having a rearward end and rearward side, with said body portion forward end and said rearward end of said each of said head portions including cooperating means providing for the selective and secure attachment of said each of said head portions to said body portion, whereby a user of said lure may select one of said head portions as desired and according to environmental conditions, and secure the selected said one of said head portions to said body portion to provide a lure suitable for the given conditions;

means providing for the alignment of said each of said head portions with said body portion of said lure, said means providing for the alignment of said each of said head portions with said body portion comprise:

said body portion forward end having a concentric plug extending therefrom with four equally spaced helical ramps disposed about said concentric plug, and said forward side portions of said body portion including two diametrically opposed latches installed therein, and;

said rearward end of said each of said head portions having a concentric socket formed therein with said socket having side walls including four equally spaced slots formed therein and cooperating with said helical ramps of said body portion, and said rearward side portions of said each of said head portions each including two diametrically opposed grooves formed therein and cooperating with said latches of said body portion, whereby;

said one of said head portions is aligned upon said body portion by helically threading said one of said head portions upon said body portion by means of said cooperating helical ramps and slots and oriented to provide alignment of said latches with said cooperating grooves, with said alignment of said latches and said grooves precluding improper alignment of said body portion and said one of said head portions when said one of said head portions is helically advanced to seat upon said body portion.

2. The fishing lure of claim 1 wherein:
said lure is provided with positive buoyancy.

3. The fishing lure of claim 1 wherein:
said head portion includes means providing for the bottom running of said lure.

4. The fishing lure of claim 1 wherein:
said head portion includes means providing for the surface running of said lure.

5. The fishing lure of claim 1 wherein:
said head portion includes means providing for the oscillating action of said lure.

6. The fishing lure of claim 1 wherein:
said head portion includes means providing for the turbulent disturbance of the water.

7. The fishing lure of claim 1 including:
means providing for the removable replacement of said at least one hook on said body.

8. The fishing lure of claim 12, wherein said means providing for the removable replacement of said at least one hook on said body comprises:
said body portion including an eye installed thereon for each of said at least one hook, with said at least one hook including an eye formed therein; and
a split ring removably installable in said eye of said body portion, with said at least one hook eye removably installable upon said split ring to provide for the removable attachment of said at least one hook to said body portion.

9. The fishing lure of claim 1 wherein:
said lure is formed of wood.

10. The fishing lure of claim 1 wherein:
said lure is formed of a synthetic material.

11. The fishing lure of claim 10 wherein:
said synthetic material comprises plastic.

12. A fishing lure providing for the interchangeability of portions thereof, comprising:
a universal body portion including at least one hook attached thereto;

a plurality of head portions each singly attachable to said universal body portion, with each of said head portions including means providing for the attachment of a leader thereto and different means affecting the hydrodynamic action and path of said lure; and said body portion having a forward end and forward side and each of said head portions having a rearward end and rearward side, with said body portion forward end and said rearward end of said each of said head portions including cooperating means providing for the selective and secure attachment of said each of said head portions to said body portion, whereby a user of said lure may select one of said head portions as desired and according to environmental conditions, and secure the selected said one of said head portions to said body portion to provide a lure suitable for the given conditions;

means providing for the alignment of said each of said head portions with said body portion of said lure, said means providing for the alignment of said each of said head portions with said body portion comprise:

said body portion forward end having a concentric plug extending therefrom with four equally spaced helical ramps disposed about said concentric plug, and said forward side portions of said body portion including two diametrically opposed latches installed therein, and;

said rearward end of said each of said head portions having a concentric socket formed therein with said socket having side walls including four equally spaced slots formed therein and cooperating with said helical ramps of said body portion, and said rearward side portions of said each of said head portions each including two diametrically opposed grooves formed therein and cooperating with said latches of said body portion, whereby;

said one of said head portions is aligned upon said body portion by helically threading said one of said head portions upon said body portion by means of said cooperating helical ramps and slots and oriented to provide alignment of said latches with said cooperating grooves, with said alignment of said latches and said grooves precluding improper alignment of said body portion and said one of said head portions when said one of said head portions is helically advanced to seat upon said body portion; and means providing for the automatic locking of said each of said head portions to said body portion.

13. A fishing lure providing for the interchangeability of portions thereof, comprising:
a universal body portion including at least one hook attached thereto;
a plurality of head portions each singly attachable to said universal body portion, with each of said head portions including means providing for the attachment of a leader thereto and different means affecting the hydrodynamic action and path of said lure; and said body portion having a forward end and forward side and each of said head portions having a rearward end and rearward side, with said body portion forward end and said rearward end of said each of said head portions including cooperating means providing for the selective and secure attachment of said each of said head portions to said body portion, whereby a user of said lure may select one of said head portions as desired and according to ambient environmental conditions, and secure the selected said one of said head portions to said body portion to provide a lure suitable for the given conditions;

means providing for the alignment of said each of said head portions with said body portion of said lure;

said means providing for the alignment of said each of said head portions with said body portion comprise:

said body portion forward end having a concentric plug extending therefrom with four equally spaced helical ramps, disposed about said concentric plug, and said forward side portions of said body portion including two diametrically opposed latches installed therein, and;

said rearward end of said each of said head portions having a concentric socket formed therein with said socket having side walls including four equally spaced slots formed therein and cooperating with said helical ramps of said body portion, and said rearward side portions of said each of said head portions each including two diametrically opposed grooves formed therein and cooperating with said latches of said body portion, whereby said one of said head portions is aligned upon said body portion by helically threading said one of said head portions upon said body portion by means of said cooperating helical ramps and slots and oriented to provide alignment of said latches with said cooperating grooves, with said alignment of said latches and said grooves precluding improper alignment of said body portion and said one of said head portions when said one of said head portions is helically advanced to seat upon said body portion; and means providing for the automatic locking of said each of said head portions to said body portion;

said means providing for the automatic locking of said each of said head portions to said body portion comprises:

spring means forwardly biasing each of said latches in said forward side portions of said body portion to engage said grooves in said one of said head portions, whereby said spring means are compressed and said latches are urged to a retracted position as said rearward portion of said one of said head portions contacts said latches as said one of said head portions is helically advanced upon said body portion, with said latches moving forward due to said spring means to engage automatically said grooves of said one of said head portions when said grooves are aligned with said latches.

* * * * *